(12) United States Patent
Odiot

(10) Patent No.: US 10,697,071 B2
(45) Date of Patent: Jun. 30, 2020

(54) PROCESS FOR INHIBITING THE CORROSION OF METAL SURFACES

(71) Applicant: SOLENIS TECHNOLOGIES, L.P., Wilmington, DE (US)

(72) Inventor: Karine Odiot, Ludwigshafen (DE)

(73) Assignee: SOLENIS TECHNOLOGIES, L.P., Wilmington, DE (US)

(*) Notice: Subject to any disclaimer, the term of this patent is extended or adjusted under 35 U.S.C. 154(b) by 169 days.

(21) Appl. No.: 15/565,182

(22) PCT Filed: Apr. 4, 2016

(86) PCT No.: PCT/EP2016/057348
§ 371 (c)(1),
(2) Date: Oct. 9, 2017

(87) PCT Pub. No.: WO2016/162307
PCT Pub. Date: Oct. 13, 2016

(65) Prior Publication Data
US 2018/0100239 A1    Apr. 12, 2018

(30) Foreign Application Priority Data
Apr. 10, 2015   (EP) .................................... 15163196

(51) Int. Cl.
| | | |
|---|---|---|
| *C23F 11/173* | (2006.01) | |
| *C23F 11/14* | (2006.01) | |
| *C22C 38/00* | (2006.01) | |
| *C08G 73/02* | (2006.01) | |
| *C08L 79/02* | (2006.01) | |
| *C08L 79/00* | (2006.01) | |

(52) U.S. Cl.
CPC ........ *C23F 11/173* (2013.01); *C08G 73/0206* (2013.01); *C08L 79/02* (2013.01); *C22C 38/004* (2013.01); *C23F 11/141* (2013.01); *C08L 79/00* (2013.01)

(58) Field of Classification Search
None
See application file for complete search history.

(56) References Cited

U.S. PATENT DOCUMENTS

| | | | |
|---|---|---|---|
| 4,692,316 A | 9/1987 | Greaves et al. | |
| 4,728,546 A * | 3/1988 | Rasmussen | B05D 7/14 106/14.05 |
| 6,461,440 B1 * | 10/2002 | Sutoris | B01J 19/02 134/2 |
| 8,535,456 B2 * | 9/2013 | Ishii | C25D 13/20 148/247 |
| 8,697,834 B2 | 4/2014 | Schaub et al. | |
| 9,472,420 B2 * | 10/2016 | Casteel, Jr. | H01L 21/02063 |
| 2007/0175750 A1 * | 8/2007 | Schwarz | C23F 13/06 204/196.01 |
| 2007/0270323 A1 * | 11/2007 | Stedry | C11D 1/62 510/201 |
| 2010/0143632 A1 | 6/2010 | Djenadi et al. | |
| 2011/0100830 A1 * | 5/2011 | Ishii | C25D 13/20 205/238 |
| 2014/0163199 A1 | 6/2014 | Hueffer et al. | |
| 2018/0100239 A1 * | 4/2018 | Odiot | C08L 79/02 |

FOREIGN PATENT DOCUMENTS

| | | |
|---|---|---|
| EP | 0 155 846 A2 | 9/1985 |
| EP | 2 194 095 A1 | 6/2010 |
| WO | 2013/045258 A1 | 4/2013 |

OTHER PUBLICATIONS

International Search Report and Written Opinion dated Jun. 9, 2016 in PCT/EP2016/057348 (submitting Written Opinion only, International Search Report previously filed on Oct. 9, 2017).
Y. Jianguo, et al. "Polyvinylpyrrolidone and Polyethylenimine as Inhibitors for the Corrosion of a Low Carbon Steel in Phosphoric Acid", Corrosion Science, vol. 37, No. 6, 1995, pp. 975-985.
International Search Report dated Jun. 9, 2016 in PCT/EP2016/057348 filed Apr. 4, 2016.

* cited by examiner

*Primary Examiner* — Joseph D Anthony
(74) *Attorney, Agent, or Firm* — Lorenz & Kopf, LLP

(57) ABSTRACT

Process for inhibiting the corrosion of a metal surface M, wherein said metal surface M is essentially made of carbon steel, comprising treating said metal surface M with a polyethylene imine P in aqueous medium.

7 Claims, No Drawings

PROCESS FOR INHIBITING THE CORROSION OF METAL SURFACES

The present invention is related to a process for inhibiting the corrosion of a metal surface M, wherein said metal surface M is essentially made of carbon steel, comprising treating said metal surface M with a polyethylene imine P in aqueous medium.

The corrosion of metal is an almost omnipresent phenomenon for all surfaces that are in contact with water.

Among the surfaces where the inhibition of corrosion is of particular importance are circuits like cooling or heating circuits that are in permanent contact with water.

Numerous approaches for improving the corrosion behavior of metal surfaces have been suggested in the art. While many approaches for the corrosion inhibition of stainless steel have been described, there is still a need for effective corrosion inhibition methods for carbon steel.

A large number of corrosion inhibitors have been developed and used for application to various systems depending on the medium treated, the type of surface that is susceptible to corrosion, the type of corrosion encountered, and the conditions to which the medium is exposed. The efficiency and usefulness of a corrosion inhibitor under one set of circumstances often does not imply the same for another set of circumstances. In many applications like industrial water treatment systems, a combination of more than one corrosion inhibitors along with other additives such as antiscalants, biocides and polymeric dispersants are supplied.

Schweinsberg et al., Corrosion Science, 37, 1995, 975-985 describe polyvinyl pyrrolidone and polyethyleneimine as inhibitors for the corrosion of steel in phosphoric acid.

US 2010/0143632 discloses coating compositions comprising polyethyleneimine in combination with poly(meth)acrylic acid or salts thereof for corrosion control of steel.

EP 2 194 095 A1 discloses mixtures of polyethylene imines of poly(meth)acrylates that are used in coatings of metal surfaces.

It was an objective of the present invention to provide a process for the inhibition of corrosion on metal surfaces made of carbon steel that is effective at an essentially neutral pH.

This objective has been solved by processes for inhibiting the corrosion of a metal surface M, wherein said metal surface M is essentially made of carbon steel, comprising treating said water with a polyethylene imine P in aqueous medium.

In the context of this application, the term "inhibition of corrosion" shall mean the decrease or prevention of the formation of metal compounds on a metal surface, in particular a steel surface. Examples of corrosion of steel include the formation of iron oxide or iron hydroxides by reaction of iron with oxygen in the presence of water, also referred to as "rust".

Processes according to the invention are suitable for protecting metal surfaces M comprising carbon steel. Carbon steel in the context of this application shall mean steel that is not stainless steel. Stainless steel shall be understood to mean steel that does not readily corrode, rust or stain with water. Stainless steel has a chromium content of at least 10.5% by weight.

Preferably, metal surface M comprises carbon steel in which the main interstitial alloying constituent is carbon in the range of 0.12-2.0% by weight.

Even more preferably, metal surface M comprises carbon steel in which the main interstitial alloying constituent is carbon in the range of 0.12-2.0% by weight and that does not comprise more than 1.65% of manganese, 0.6% of silicon and 0.6% of copper. All percentages gives in this application are weight percentages unless stated otherwise.

In one embodiment, metal surface M comprises mild steel, also referred to a low-carbon steel or plain steel. Low-carbon steel contains approximately 0.05-0.30% carbon.

Higher carbon steels normally have a carbon content in the range of 0.30-2%.

Medium carbon steel has a carbon content of 0.31-0.59%.

High-carbon steel has a carbon content of 0.6-0.99%.

Ultra-high-carbon steel has a carbon content of 1.0-2.0%.

Metal surface M can in principle be part of any apparatus that is in contact with water.

In one preferred embodiment, metal surface M is part of an apparatus, in which water circulates.

In one preferred embodiment, metal surface M is part of a cooling circuit, heating circuit or other kind of energy exchange circuit.

In an especially preferred embodiment, metal surface M is part of a cooling circuit. Examples of cooling circuits include closed cooling systems, open cooling circuits and open recirculating cooling systems, including cooling towers and evaporative condensers.

Open cooling circuits are for example present in open cooling circuit towers and operate on the principle of evaporative cooling. They are also sometimes referred to as "once-through coolers", because the cooling water passes through the system to remove heat and then discharges to natural environment.

In open recirculating cooling circuits the cooling water continuously recirculates between the heat source and the cooling tower.

Closed cooling circuits pass the cooling fluid (in many cases an aqueous medium, vulgo "cooling water") through a tube bundle, upon which clean water is sprayed and a fan-induced draft applied.

Especially preferably, metal surface M is part of an open cooling circuit or open recirculating cooling systems.

Processes according to the invention comprise treating said metal surface M with at least one polyethylene imine P in aqueous medium.

Polyethyleneimine P ("PEI") is a polymer with repeating unit composed of an amine group and two carbon aliphatic $CH_2CH_2$ spacer. Linear polyethyleneimines contain all secondary amines (with the exception of the terminal positions), in contrast to branched Polyethyleneimines P which contain primary, secondary and tertiary amino groups. Polyethyleneimine P can also be in a dendrimeric form that is entirely branched.

The composition of polyethyleneimine can in one embodiment be expressed by the following general molecular formula:

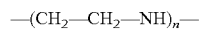

$$-(CH_2-CH_2-NH)_n-$$

With $10 < n < 10^5$.

Suitable polyethyleneimine P can be linear, branched or dendrimeric. Preferably, Polyethyleneimine P is branched.

Suitable Polyethyleneimines are for example available from BASF under the trade name Lupa-Sol®.

Branched polyethyleneimine P can be prepared by ring opening polymerization of aziridine.

In one embodiment, polyethyleneimine P is prepared as disclosed in US 2014/163199 in [0014] to [0031].

In one embodiment, polyethyleneimine P is prepared as disclosed in U.S. Pat. No. 8,697,834 col 2, ln 53 to col 9 ln 26.

Polyethyleneimine P normally has a molecular weight Mw of 500 to 2,000,000 g/mol (Mw determined by GPC at pH 4.5; solvent THF, Mw determined by comparison over polystyrene standard).

In one embodiment, polyethyleneimine P has an average molecular weight Mw of 500 to 1500.

In one embodiment, polyethyleneimine P has an average molecular weight Mw of 1501 to 50,000.

In one embodiment, polyethyleneimine P has an average molecular weight Mw of 50,001 to 2,000,000.

Preferably, Polyethyleneimine P has a molecular weight Mw of 600 to 1000, more preferably 700 to 900.

Polyethyleneimine P normally has a viscosity of more than 3000 (water content 1% according to DIN 53715, K. Fischer; concentration 99% according to ISO 3251; viscosities herein are according to Brookfield, ISO 2555 and given in [mPa s]).

In one embodiment, polyethyleneimine P has a viscosity of 3000 to 10,000, preferably 4000 to 9000 (water content 1% according to DIN 53715, K. Fischer; concentration 99% according to ISO 3251).

In one embodiment, polyethyleneimine P has a viscosity of 10,001 to 100,000 (water content 1% according to DIN 53715, K. Fischer; concentration 99% according to ISO 3251).

In one embodiment, polyethyleneimine P has viscosity higher than 100,000 or 200,000 (water content 1% according to DIN 53715, K. Fischer; concentration 99% according to ISO 3251).

Preferably, Polyethyleneimine P has a viscosity of 3000 to 7000, more preferably 4000 to 6000 (water content 1% according to DIN 53715, K. Fischer; concentration 99% according to ISO 3251).

In one embodiment, polyethyleneimine P has a viscosity of 100 to 500, preferably 200 to 450 (water content 50% according to DIN 53715, K. Fischer; concentration 50% according to ISO 3251).

In one embodiment, polyethyleneimine P has a viscosity of 501 to 15,000 (water content 50% according to DIN 53715, K. Fischer; concentration 50% according to ISO 3251).

In one embodiment, polyethyleneimine P has viscosity higher than 15,001 (water content 50% according to DIN 53715, K. Fischer; concentration 50% according to ISO 3251).

In one embodiment, polyethyleneimine P has viscosity from 15,001 (water content 50% according to DIN 53715, K. Fischer; concentration 50% according to ISO 3251) to 800 (water content 76% according to DIN 53715, K. Fischer; concentration 24% according to ISO 3251).

Preferably, Polyethyleneimine P has a viscosity of 200 to 450 (water content 50% according to DIN 53715, K. Fischer; concentration 50% according to ISO 3251).

According to processes according to the invention, metal surface M is treated with polyethylene imine P in aqueous medium. In the case of open, open recirculating or closed cooling circuits, said aqueous medium can for example be the cooling fluid of said cooling circuit.

An "aqueous medium" in the context of this application shall mean a liquid that comprises at least 60% by weight, preferably at least 70%, more preferably at least 90% by weight and even more preferably at least 99% by weight of water.

According to the invention, the treatment of metal surface M with polyethylene imine P is carried out in aqueous medium, with said metal surface M being in permanent contact with said aqueous medium comprising polyethylene imine P. Processes according to the invention do not comprise the application of a coating comprising polyethyleneimine P. A "coating" in this context means a polymeric coating with an average thickness of at least 200 nm that comprises a polymeric binder different from polyethyleneimine P and optionally other additives. Examples of such a coating are for example paints or laquers.

In cooling circuits like open or closed cooling circuits, polyethyleneimine P is normally comprised in the cooling fluid.

The expression "in permanent contact" in this context implies that said metal surface M is not only in contact with said aqueous medium comprising polyethylene imine P once or during specific and short points in time, as for example for the application of a coating from an aqueous medium. Rather said metal surface M is in contact with said aqueous medium continuously over long periods of time, for example for more than one day, week, month or year. For example if metal surface M is part of a cooling system, said aqueous medium comprising polyethylene imine P can be the cooling water and said metal surface M is in permanent contact with said aqueous medium whenever said cooling system is in operation.

In open cooling circuits, suitable cooling fluids are normally aqueous media that comprise at least 95% by weight, preferably at least 99% by weight of water.

In closed cooling circuits, suitable cooling fluids are normally aqueous media that comprise at least 60% by weight, preferably at least 70% of water. In one embodiment suitable cooling fluids in closed cooling circuits comprise at least 90% by weight or at least 99% by weight of water. Cooling fluids in closed cooling circuits may comprise 0.1 to 40, preferably 5 to 30% by weight of anti-freezing agents like ethylene glycol.

Normally, the concentration of polyethyleneimine P in said aqueous medium is from 1 ppm to 1000 ppm by weight.

In open and open recirculating cooling circuits the concentration of polyethyleneimine P is preferably 2 to 100 ppm, even more preferably 3 to 50 ppm end especially 5 to 20 ppm by weight.

In closed systems, the concentration of polyethyleneimine P is in one embodiment 1 to 100 ppm by weight, preferably 3 to 50 ppm end even more preferably 5 to 20 ppm by weight.

In another embodiment, the concentration of polyethyleneimine P in closed systems is 101 to 1000 ppm, preferably 200 to 500 ppm by weight.

In open cooling circuits or open recirculating cooling circuits, cooling is achieved through evaporation of water and the evaporated water is constantly replaced by fresh water ("make-up water"). Said make-up water can for example be fluvial water, lake water, tap water, brackish water or deionized or distilled water. In one embodiment, such make-up water is subjected to a pretreatment prior to being introduced into the cooling circuit.

Preferably, such make-up water contains polyethyleneimine P in an amount to keep the concentration polyethyleneimine P in the aqueous medium (the cooling fluid) at an essentially constant level. Preferably the concentration of polyethyleneimine P in the cooling fluid differs by not more than 25 wt % over the average concentration.

In closed cooling circuits, the cooling fluid is only consumed slowly and refreshed or exchanged sporadically. When the cooling fluid in such cooling circuits is refreshed or exchanged, newly introduced cooling fluid normally contains polyethyleneimine P in an amount to keep the concentration polyethyleneimine P in the aqueous medium in the cooling fluid at an essentially constant level. Preferably the concentration of polyethyleneimine P in the cooling fluid differs by not more than 25 wt % over the average concentration.

Preferably, the treatment of metal surface M with polyethyleneimine P is carried out at a pH from 6.0 to 9.0, more preferably 6.5 to 8.5.

Processes according to the invention can in principle be carried using an aqueous medium of any hardness.

In one embodiment, the total hardness of the aqueous medium as $CaCO_3$ is 1 to 100 mg/l. In another embodiment, the total hardness of the aqueous medium as $CaCO_3$ is 101 to 1000 mg/l, In another embodiment, the total hardness of the aqueous medium as $CaCO_3$ is higher than 1000 mg/l, the total hardness being the sum of calcium and magnesium, expressed as mg/l calcium carbonate ($CaCO_3$).

It was one surprising result of the invention that polyethylene imine was an effective corrosion inhibitor for surfaces of carbon steel at a pH from 6.0 to 9.0.

In one embodiment polyethyleneimine P is applied to metal surface M in combination with further corrosion inhibitors.

Further corrosion inhibitors can for example be organic phosphonates like 1-hydroxyethylidene-1,1-diphosphonic acid, amino tris(methylenephosphonic acid, ethylenediamine tetra(methylene phosphonic acid), tetramethylenediamine tetra(methylene phosphonic acid), hexamethylenediamine tetra(methylene phosphonic acid), diethylenetriamine penta(methylene phosphonic acid), phosphonobutane-tricarboxylic acid, N-(phosphonomethyl)iminodiacetic acid, 2-carboxyethyl phosphonic acid, 2-Hydroxyphosphonocarboxylic acid, amino-tris-(methylene-phosphonic acid), N,N-Bis(phosphonomethyl)glycine or their salts or hydroxyphosphonic acid.

Further corrosion inhibitors can further be chromates, molybdates, silicates, nitrites, nitrates, phosphates, polyphosphates, pyrophosphates, orthophosphates or zinc salts, especially zinc phosphates.

In one embodiment a surface of carbon steel is treated with polyethylene imine at a pH from 6 to 9 in the absence of poly(meth)acrylates like any poly(meth)acrylic acid or their salts.

The aqueous medium comprising polyethyleneimine P may further comprise other additives like further corrosion inhibitors, antiscalants, chelating agents, anti-freeze agents, detergents, dispersants, biodispersants, biocides, antifoams and defoamers.

Another aspect of the invention is the use of polyethylene imine P as a corrosion inhibitor for metal surfaces M.

Processes according to the invention are very effective and efficient with respect to the inhibition of corrosion on metal surfaces M.

Processes according to the invention are also very economical and environmentally friendly.

Processes according to the invention do not use metallic ion corrosion inhibitors, like zinc $Zn^{2+}$, molybdate and chromate which are restricted by local and global regulations.

Processes according to the invention are also do not induce or contribute to the formation of scale.

EXAMPLES

The efficiency of corrosion inhibition processes was classified according to Bennett P. Boffardi, Ph.D., FNACE. "Standards for Corrosion Rates", AWT Analyst, Spring 2000 as follows:

Classification of Corrosion Rates for Open Recirculating Cooling Water Systems (Corrosion Rates, expressed in milli-inch per year (mpy)), for carbon steel:
  Negligible or Excellent: less than or equal to 1
  Mild or Very Good: 1 to 3
  Good: 3 to 5
  Moderate to Fair: 5 to 8
  Poor: 8 to 10
  Very Poor to Severe: >10
Classification of Corrosion Rates for Closed Recirculating Cooling Water Systems (Corrosion Rates, mpy), for Carbon Steel
  Excellent: Less than or equal to 0.2
  Good: 0.2 to 0.5
  Moderate: 0.5 to 0.8
  Poor: 0.8 to 1
  Very Poor to Severe: Greater than or equal to 1

Example 1

Examples for the Application in Open Recirculating Systems:

The methods used for the screening of corrosion inhibitors for low carbon steel were electrochemical measurements by using Linear Polarization Resistance (LPR) and the Tafel Slopes. A Gamry potentiostat and a Gamry corrosion software are used to run the electrochemical measurements, and specially:
  a Gamry Reference 600 potentiostat
  a Gamry ECM8 Multiplexer
  3 Electrodes set-up:
    ALS plate evaluation cell
    Electrolyte Volume: 1 ml
    WE: CRS, CE: Pt wire, RE: sat Ag/AgCl
    Active area: 0.5 $cm^2$ As a substrate, a low carbon steel Chemetall Gardobond test panel 0 C with a chromium content below 0.1% by weight and a has been selected to represent the quality of carbon steel installed in cooling system.

It is available as a cold rolled (LCS), which was then degreased with isopropanol, and cleaned with acetone.

The following test protocol has been employed:
  Use of blended soft and acidified water qualities, representative of open recirculating cooling systems
  Test methodology (T=22±1° C.):
  Stabilization of open circuit potential for 1 h
  LPR measurement
  Cathodic potentiodynamic (Tafel slope) measurement
  Change of specimen
  Stabilization of open circuit potential for 1 h
  LPR measurement (optionally)
  Anodic potentiodynamic (Tafel slope) measurement
  Data analysis The corresponding standard to draw the Tafel slopes are available within the DIN ISO 17475:2008.

Then, the corrosion rate was obtained by combining the Butler-Volmer equation (Tafel) and the Stern-Geary equation (LPR).

Calculation of corrosion rate:
  $\beta_a$ from anodic Tafel slope measurement
  $\beta_c$ from cathodic Tafel slope measurement
  $\beta_c$ & $\beta_a$ determined by fit of Tafel equation
  $R_p$ (resp. $I_{corr}$) and $U_{corr}$ from LPR measurement $$CR\ [mm/year] = \beta_a \beta_c KEW/(2.3(\beta_a+\beta_c)\rho A R_p)$$

$\beta_a$: Anodic Tafel slope
$\beta_c$: Cathodic Tafel slope

K: 3272 for mmpy
EW: Equivalent weight of Fe→27.92 g/eq.
ρ: Density of Fe→7.87 g/cm$^3$
A: Sample Area→0.5 cm$^2$
$R_p$: Polarization resistance

TABLE 1

Water quality representative of open recirculating cooling systems. Total Hardness (TH), is the sum of calcium hardness and magnesium hardness. The total Alkalinity, or methylorange Alkalinity (M-Alk), includes the concentration of the bicarbonates, carbonates and hydroxides.

| Quality | Units | Blended soft | Acidified |
|---|---|---|---|
| Total Hardness (TH) | mg/L CaCO$_3$ | 80 | 410 |
| THCa | mg/L CaCO$_3$ | 80 | 410 |
| M-Alk | mg/L CaCO$_3$ | 1020 | 60 |
| Chloride | mg/L | 77 | 124 |
| Sulphate | mg/L | 75 | 750 |
| pH | — | 8.3 | 7.2 |
| Conductivity σ | μS/cm | 2030 | 1960 |

Table 2 shows the Corrosion rate (in μm/year) in water of the model open recirculating cooling system.

The results in Table 2 show that the compound of this invention are as efficient as the zinc salts in acidified water, but much more efficient than the zinc salts in blended soft water.

TABLE 2

Corrosion rate (in μm/year) of a model open recirculating cooling system using different corrosion inhibitors. The viscosity of PEI with Mw 800 was 5000 mPas (water content 1% according to DIN 53715, K. Fischer; concentration 99% according to ISO 3251). The viscosity of PEI with Mw 750000 was 25000 mPas (water content 50% according to DIN 53715, K. Fischer; concentration 50% according to ISO 3251). The viscosity of PEI with Mw 2,000,000 was 700 mPas (water content 76% according to DIN 53715, K. Fischer; concentration 24% according to ISO 3251).

| | In acidified water | In blended soft water |
|---|---|---|
| Without Inhibitor | 109.1 | 291.0 |
| Zinc sulphate (2 mg/L) | 43.0 | 61.1 |
| Zinc sulphate (10 mg/L) | 44.2 | 61.2 |
| PEI MW 800 (dosed at 10 mg/L) | 48.3 | 43.0 |
| PEI MW 750000 (dosed at 10 mg/L) | 83.1 | 17.7 |
| PEI MW 2000000 (dosed at 10 mg/L) | 50.5 | 41.1 |

Example 2

Equipment Used for Example 2:
  Gamry Reference 600 Potentiostat
  Gamry ECM8 Multiplexer
  3 Electrode set-up
  Working electrode: C1010 coupon
  Counter electrode: Graphite rod
  Reference electrode: Saturated calomel electrode (SCE)
  Coupon surface area: 4.75 cm$^2$
Test Protocol:
  16 hours exposure
  Continuous Linear Polarization Resistance (LPR) measurements
  Cathodic and anodic Tafel slope Measurements
  Calculation of corrosion rate:
  βa from anodic Tafel slope measurement
  βc from cathodic Tafel slope measurement
  Rp from LPR measurement

TABLE 3

Water quality for the example 2.
Water quality at 50° C.

| | |
|---|---|
| Ca as CaCO$_3$ (ppm) | 300 |
| Mg as CaCO$_3$ (ppm) | 150 |
| Total Hardness as CaCO$_3$ (ppm) | 450 |
| Alkalinity as CaCO$_3$ (ppm) | 200 |
| Chloride (ppm) | 212 |
| Sulfate (ppm) | 142 |
| pH | 8.3 |
| Langelier Saturation Index (50° C.) | 1.3 |
| Ryznar Index (50° C.) | 5.7 |
| Addition of PBTC (ppm) | 7.3 |

TABLE 4

Results of the corrosion rates with PEIs at different dosages:

| | | | | |
|---|---|---|---|---|
| Without inhibitor | 859 μm/y (33.8 mpy) | | | |
| 4 ppm as Zn | 775 μm/y (30.5 mpy) | | | |
| Polyethyleneimine used | 10 ppm | 50 ppm | 100 ppm | 200 ppm |
| Molecular Weight 800 | 411 μm/y (16.2 mpy) | 135 μm/y (5.31 mpy) | 56 μm/y (2.2 mpy) | 129 μm/y (5.08 mpy) |
| Molecular Weight 2000 | 159 μm/y (6.27 mpy) | 167 μm/y (6.56 mpy) | 215 μm/y (8.5 mpy) | 594 μm/y (23.4 mpy) |
| Molecular Weight 25000 | 458 μm/y (18.02 mpy) | 912 μm/y (35.89 mpy) | 967 μm/y (38.07 mpy) | 902 μm/y (35.51 mpy) |
| Molecular Weight 2000000 | 385 μm/y (15.15 mpy) | 158 μm/y (6.21 mpy) | 146 μm/y (5.74 mpy) | 153 μm/y (6.02 mpy) |

1 mpy=25.4 μm/year

The results in table 4 show that the synergy PBTC and PEIs are much more efficient than the synergy PBTC and Zinc salts.

Example 3

Examples for the Application in Closed Systems:
Test Setup:
  Gamry Glass Cell
  Corrater meter
  Corrater 2-Probe Electrode
  Coupon surface area: 4.75 cm$^2$
Test Protocol:
  5 days immersion
  Continuous Linear Polarization Resistance (LPR) measurements
  βa=200 mv/dec
  βc=100 mv/dec
  LPR measurement for 0.5 hr
  Cathodic scan to −0.2 V vs. open-circuit potential
  Wait one hour, anodic scan to 0.2 V vs. OC open-circuit potential

TABLE 5

Water quality for the example 3.
Water quality at 70° C.

| | |
|---|---|
| Ca as CaCO$_3$ (ppm) | 20 |
| Mg as CaCO$_3$ (ppm) | 10 |
| Total Hardness as CaCO$_3$ (ppm) | 30 |
| M-Alkalinity as CaCO$_3$ (ppm) | 200 |
| Chloride (ppm) | 56 |
| Sulfate (ppm) | 35 |
| pH | 9.0 |
| Langelier Saturation Index (70° C.) | 1.4 |
| Ryznar Index (70° C.) | 6.2 |

TABLE 6

Synergistic treatment with molybdates for closed systems

| Treatment* | NaOH (%) | BASF Antiprex ® AD 1020XP (%) | Benzotriazole (%) | Molybdates (%) | PEI (MW800) | Corrosion rate mpy | Corrosion rate μm/y |
|---|---|---|---|---|---|---|---|
| A | 10.0 | 1.9 | 1.7 | 5.0 |  | 1.72 | 44 |
| B | 10.1 | 1.9 | 1.7 | 5.0 | 6.7 | 0.13 | 3 |

TABLE 7

Synergistic treatment with PBTC (phosphonate) for closed systems

| Treatment* | KOH (%) | BASF Antiprex AD 1020XP | Benzotriazole (%) | PBTC (%) | PEI (MW800) (%) | Corrosion rate mpy | Corrosion rate μm/y |
|---|---|---|---|---|---|---|---|
| C | 9.0 | 2.5 | 0.5 | 4.1 |  | 0.23 | 6 |
| D | 9.0 | 2.5 | 0.5 | 4.0 | 5.1 | 0.20 | 5 |

*Treatment applied at 1 g/L

The results showed in the tables 6 and 7 demonstrated that the addition of the polyethyleneimine to a molybdate-based formulation improved significantly the corrosion protection of the carbon steel.

The invention claimed is:

1. A process for inhibiting corrosion of a metal surface M in contact with an aqueous medium having a pH of from about 6.0 to about 9.0, wherein said metal surface M is essentially made of carbon steel in which the main interstitial alloying constituent is carbon in the range of 0.12-2.0% by weight, the process comprising treating the aqueous medium that is in contact with the metal surface M with a branched polyethylene imine wherein said polyethylene imine is present in said aqueous medium in an amount 1 to 1000 ppm by weight.

2. The process of claim 1, wherein the metal surface M is part of a cooling or heating circuit.

3. The process of claim 1, wherein the metal surface M is part of an open, an open recirculating, or a closed cooling circuit.

4. The process of claim 1, wherein the polyethylene imine has an average molar mass Mn of 500 to 25,000 g/mol.

5. The process of claim 1, wherein the polyethylene imine has a Brookfield viscosity of 100 to 15000 mPas in 50% by weight solution in water.

6. The process of claim 1, wherein the aqueous medium is treated with the polyethylene imine in the absence of poly(meth)acrylic acid or salts thereof.

7. A process for inhibiting corrosion of a metal surface M in contact with an aqueous medium having a pH of from about 6.0 to about 9.0, the metal surface M is essentially made of carbon steel in which the main interstitial alloying constituent is carbon in the range of 0.12-2.0% by weight, the process comprising treating the aqueous medium that is in contact with the metal surface M with a branched polyethylene imine and wherein the aqueous medium is absent of poly(meth)acrylic acid or salts thereof; and wherein said polyethylene imine is present in the aqueous medium in an amount 1 to 1000 ppm by weight.

* * * * *